United States Patent
Huang

(10) Patent No.: US 9,385,760 B2
(45) Date of Patent: Jul. 5, 2016

(54) WIRELESS SIGNAL RECEIVING DEVICE AND METHOD

(71) Applicant: REALTEK SEMICONDUCTOR CORPORATION, Hsinchu (TW)

(72) Inventor: Ming-Chung Huang, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 65 days.

(21) Appl. No.: 14/521,756

(22) Filed: Oct. 23, 2014

(65) Prior Publication Data
US 2015/0133070 A1 May 14, 2015

(30) Foreign Application Priority Data
Nov. 14, 2013 (TW) .............................. 102141465 A

(51) Int. Cl.
*H04M 1/00* (2006.01)
*H04B 7/185* (2006.01)
*H04B 1/00* (2006.01)

(52) U.S. Cl.
CPC ..................... *H04B 1/005* (2013.01)

(58) Field of Classification Search
CPC ......... H04B 1/0007; H04B 7/04; H04W 4/02; H04W 4/025; H04W 4/04; H04M 1/72572
USPC ............. 455/12.1, 132, 137, 140, 427, 552.1, 455/553.1; 375/316
See application file for complete search history.

(56) References Cited

U.S. PATENT DOCUMENTS

| | | | | |
|---|---|---|---|---|
| 6,031,879 A * | 2/2000 | Pace ....................... | H04B 1/406 | 375/316 |
| 6,104,340 A * | 8/2000 | Krasner ................ | G01S 5/0027 | 342/357.64 |
| 6,363,262 B1 * | 3/2002 | McNicol .............. | H04B 1/0003 | 455/313 |
| 7,446,692 B2 * | 11/2008 | Volnhals .................. | H04B 1/28 | 341/155 |
| 8,243,579 B2 | 8/2012 | Lee et al. | | |

(Continued)

FOREIGN PATENT DOCUMENTS

TW   200840219   10/2008

OTHER PUBLICATIONS

R. Kumar et al. "Wireless Transceivers of Smart Devices," Session 19, ISSCC, 2013.

(Continued)

*Primary Examiner* — Quochien B Vuong
(74) *Attorney, Agent, or Firm* — WPAT, P.C., Intellectual Property Attorneys; Anthony King

(57) ABSTRACT

The present invention discloses a wireless signal receiving device and method capable of receiving three or more signals of different central frequencies. An embodiment of said device comprises: a receiving circuit operable to generate a reception signal according to a wireless signal including a first, second, and third wireless signals of different central frequencies; a mixer operable to generate a mixing signal by processing the reception signal according to an oscillation clock in which the mixing signal includes a first, second and third intermediate-frequency (IF) signals and the central frequency of the third IF signal is higher than the other two; and a digital signal generating circuit operable to generate a first, second and third digital signals by processing the first, second and third IF signals according to a sampling frequency in which the sampling frequency is lower than two times the maximum frequency of the third IF signal.

19 Claims, 6 Drawing Sheets

(56) References Cited

U.S. PATENT DOCUMENTS 8,514,997 B2 * 8/2013 Rofougaran .......... H03D 3/009
  375/354
8,630,381 B2 * 1/2014 Seo ...................... H04B 1/0007
  375/350

OTHER PUBLICATIONS

Office Action from the counterpart TW application 102141465 dated on Jan. 13, 2015.

English translation of the Office Action from the counterpart TW application 102141465 dated on Jan. 13, 2015.

* cited by examiner

WIRELESS SIGNAL RECEIVING DEVICE AND METHOD

BACKGROUND OF THE INVENTION

1. Field of the Invention

The present invention relates to a signal receiving device and method, especially to a wireless signal receiving device and method.

2. Description of Related Art

Signals to be processed in a baseband circuit are usually at a lower frequency for operation consideration and power conservation, but signals to be sent through wireless transmission are usually carried on a higher frequency for the prevention of transmission loss; accordingly, baseband signals of lower frequency will be up-converted into radio signals of higher frequency by a radio-frequency (RF) circuit before wireless transmission, and radio signals of higher frequency will be down-converted into baseband signals of lower frequency by the RF circuit for baseband operation. Take the reception of satellite positioning signals for example. The frequency of a common satellite positioning signal is normally above 1.5 GHz; during the reception process, the satellite positioning signal will be down-converted into an intermediate-frequency (IF) signal (whose frequency is normally at dozens of MHz) first after it is received by an RF circuit, and then down-converted into a baseband signal (whose frequency is normally between several MHz and tens of MHz). However, if a satellite positioning signal receiver is applicable to several kinds of satellite position systems (e.g. Global Positioning System (GPS) of United States, Galileo Positioning System (Galileo) of Europe, Global Navigation Satellite System (Glonass) of Russia, and Beidou/Compass Navigation Satellite System (Beidou) of China), in view of the signal frequencies of different satellite positioning systems (e.g. GPS system, Glonass system and Beidou system) are distinct, the satellite positioning signal receiver is usually equipped with several sets of local oscillators and mixers to be able to take care of all types of the concerned satellite signals, and generate appropriate IF signals. Although the above-mentioned solution is straight, it unavoidably leads the increase of cost of the receiver. Other prior arts could be found in the discussion of the reference: "Wireless Transceivers of Smart Devices", Session 19, ISSCC, 2013.

Additionally, the foresaid radio signals need to go through a sampling process of analog-to-digital conversion to be converted into baseband signals. According to Nyquist Theorem, the sampling frequency has to be at least two times the maximum frequency of the signal to be sampled, so as to reconstruct the waveform of the signal to be sampled properly, or else the sampled result will suffer aliasing which means that the sampled result will be associated with an image frequency instead of the actual frequency of the signal to be sampled. However, a high sampling frequency will require significant circuit capability and power consumption of an analog-to-digital converter, which consequently leads to a high cost.

SUMMARY OF THE INVENTION

In view of the problems of the prior art, an object of the present invention is to provide a wireless signal receiving device and method to solve the problems.

Another object of the present invention is to provide a wireless signal receiving device and method to deal with a plurality of wireless signals of different central frequencies through a single local oscillation clock, and thereby offers a cost-effective solution.

A further object of the present invention is to provide a wireless signal receiving device and method to carry out sampling in a lower sampling frequency, so as to reduce the demand of circuit capability and power consumption.

The present invention discloses a wireless signal receiving device capable of receiving three or more signals of different central frequencies. An embodiment of said wireless signal receiving device comprises: a receiving circuit operable to generate a reception signal according to a wireless signal including a first, second and third wireless signals of different central frequencies; a mixer operable to generate a mixing signal by processing the reception signal according to a local oscillation clock in which the mixing signal includes a first, second and third intermediate-frequency (IF) signals related to the first, second and third wireless signals in turn while the maximum central frequency of the third IF signal is higher than the maximum central frequency of the first and second IF signals; and a digital signal generating circuit. Said digital signal generating circuit includes: a first digital signal generating path operable to process at least one of the in-phase and quadrature-phase parts of the mixing signal according to the central frequency and bandwidth of the first IF signal and a first sampling frequency, and thereby generate a first digital signal; a second digital signal generating path operable to process at least one of the in-phase and quadrature-phase parts of the mixing signal according to the central frequency and bandwidth of the second IF signal and a second sampling frequency, and thereby generate a second digital signal; and a third digital signal generating path operable to process at least one of the in-phase and quadrature-phase parts of the mixing signal according to the central frequency and bandwidth of the third IF signal and a third sampling frequency, and thereby generate a third digital signal, wherein the third sampling frequency is lower than the double of the maximum frequency of the third IF signal.

Another embodiment of the wireless signal receiving device of the present invention comprises: a receiving circuit operable to generate a reception signal according to a wireless signal including a first, second and third wireless signals of different central frequencies; a mixer operable to generate a mixing signal by processing the reception signal according to a local oscillation clock in which the mixing signal includes a first, second and third intermediate-frequency (IF) signals while the central frequency of the third IF signal is the maximum or minimum one among the central frequencies of the first, second and third IF signals; and a digital signal generating circuit. Said digital signal generating circuit includes: a dual-mode digital signal generating path operable to process at least one of the in-phase and quadrature-phase parts of the mixing signal according to the central frequencies and bandwidths of the first and second IF signals and a first sampling frequency, and thereby generate a first digital signal; and a single-mode digital signal generating path operable to process at least one of the in-phase and quadrature-phase parts of the mixing signal according to the central frequency and bandwidth of the third IF signal and a second sampling frequency, and thereby generate a second digital signal, wherein if the central frequency of the third IF signal is the maximum one among the central frequencies of the first, second and third IF signals, the second sampling frequency is lower than the double of the maximum frequency of the third IF signal; and if the central frequency of the third IF signal is the minimum one among the central frequencies of the first, second and third IF signals, the first sampling frequency is lower than the double of the maximum frequency of the first and second IF signals.

The present invention also discloses a wireless signal receiving method capable of receiving three or more signals of different central frequencies. An embodiment of said wireless signal receiving method comprises the following steps: generating a reception signal according to a wireless signal including a first, second and third wireless signals of different central frequencies; generating a mixing signal by processing the reception signal according to a local oscillation clock in which the mixing signal includes a first, second and third intermediate-frequency (IF) signals related to the first, second and third wireless signals in turn while the central frequency of the third IF signal is higher than the central frequencies of the first and second IF signals; processing at least one of the in-phase and quadrature-phase parts of the mixing signal according to the central frequency and bandwidth of the first IF signal and a first sampling frequency, and thereby generating a first digital signal; processing at least one of the in-phase and quadrature-phase parts of the mixing signal according to the central frequency and bandwidth of the second IF signal and a second sampling frequency, and thereby generating a second digital signal; and processing at least one of the in-phase and quadrature-phase parts of the mixing signal according to the central frequency and bandwidth of the third IF signal and a third sampling frequency, and thereby generating a third digital signal, wherein the third sampling frequency is lower than the double of the maximum frequency of the third IF signal.

Another embodiment of the wireless signal receiving method of the present invention comprises the following steps: generating a reception signal according to a wireless signal including a first, second and third wireless signals of different central frequencies; generating a mixing signal by processing the reception signal according to a local oscillation clock in which the mixing signal includes a first, second and third intermediate-frequency (IF) signals while the central frequency of the third IF signal is the maximum or minimum one among the central frequencies of the first, second and third IF signals; processing at least one of the in-phase and quadrature-phase parts of the mixing signal according to the central frequencies and bandwidths of the first and second IF signals and a first sampling frequency, and thereby generating a first digital signal; processing at least one of the in-phase and quadrature-phase parts of the mixing signal according to the central frequency and bandwidth of the third IF signal and a second sampling frequency, and thereby generating a second digital signal, wherein if the central frequency of the third IF signal is the maximum one among the central frequencies of the first, second and third IF signals, the second sampling frequency is lower than the double of the maximum frequency of the third IF signal; and if the central frequency of the third IF signal is the minimum one among the central frequencies of the first, second and third IF signals, the first sampling frequency is lower than the double of the maximum frequency of the first and second IF signals.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this invention field. If any term is defined in this specification, such term should be explained accordingly. Besides, the connection between objects or events in the disclosed embodiments can be direct or indirect provided that these embodiments are still practicable under such connection. Said "indirect" means that an intermediate object or a physical space exists between the objects, or an intermediate event or a time interval exists between the events.

The present invention discloses a wireless signal receiving device and a wireless signal receiving method, both of which are capable of receiving at least three wireless signals of different central frequencies. For instance, the wireless signal receiving device and method are operable to receive at least three kinds of satellite positioning signals (e.g. GPS signal of central frequency 1575.42 MHz and bandwidth 2.046 MHz; Galileo signal of central frequency 1575.42 MHz and bandwidth 4.4 MHz; Glonass signal of central frequency 1602 MHz and bandwidth 9.3 MHz; and Beidou signal of central frequency 1561.098 MHz and bandwidth 4.092 MHz). However, this is for understanding; other kinds of wireless signals could be received and processed by the present invention as long as the whole implementation is still practicable.

Figure 1:
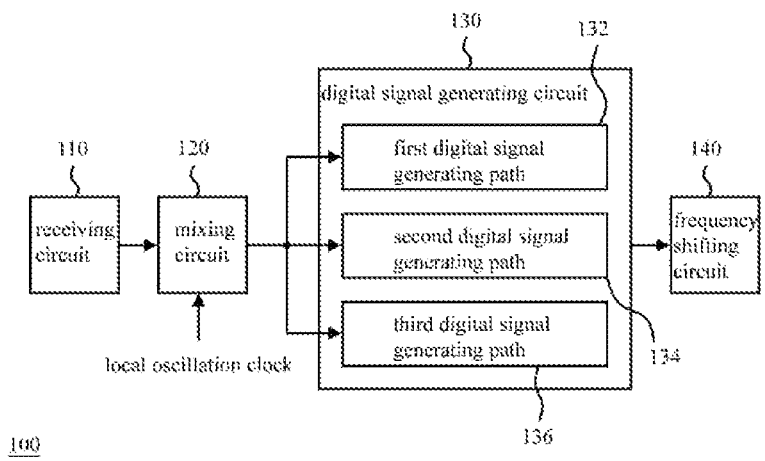
FIG. 1 illustrates an embodiment of the wireless signal receiving device of the present invention.

Please refer to FIG. 1 which illustrates an embodiment of the wireless signal receiving device of the present invention. As it is shown in FIG. 1, the wireless signal receiving device 100 comprises: a receiving circuit 110; a mixer 120; and a digital signal generating circuit 130. Said receiving circuit 110 is operable to receive a wireless signal and thereby generate a reception signal in which the wireless signal includes a first wireless signal (e.g. Beidou signal), a second wireless signal (e.g. GPS signal or Galileo signal) and a third wireless signal (e.g. Glonass signal) while the central frequencies of the first, second and third signals are all different. In this embodiment, the bandwidths of the first, second and third wireless signals are all different as well, and the intervals between any adjacent two of the central frequencies of the three signals are different, too; however, the circumstances of said bandwidths and central frequencies could be determined by those of ordinary skill in the art in view of the application or demand they want. Said mixer 120 is operable to generate a mixing signal by processing the reception signal according to a local oscillation clock (e.g. an oscillation clock of frequency 1558 MHz or 1607 MHz) in which the mixing signal includes a first intermediate-frequency (IF) signal (e.g. an IF signal of frequency (1561.098−1558)=3.098 MHz or (1607−1602)=5 MHz), a second IF signal (e.g. an IF signal of frequency (1575.42−1558)=17.42 MHz or (1607−1575.42)=30.58 MHz) and a third IF signal (e.g. an IF signal of frequency (1602−1558)=44 MHz or (1607−1561.098)=45.902 MHz); the first, second and third IF signals are related to the first, second and third wireless signals in turn or the reversed sequence thereof, while the central frequency of the third IF signal is higher than any of the central frequencies of the first and second IF signals. Said digital signal generating circuit 130 includes: a first, second and third digital signal generating paths 132, 134, 136 operable to generate a first, second and third digital signals respectively. More specifically, the first digital signal generating path 132 is operable to process at least one of the in-phase and quadrature-phase parts of the mixing signal according to the central frequency and bandwidth of the first IF signal and a first sampling frequency, and thereby generate the first digital signal; the second digital signal generating path 134 is operable to process at least one of the in-phase and quadrature-phase parts of the mixing signal according to the central frequency and bandwidth of the second IF signal and a second sampling frequency, and thereby generate the second digital signal; and the third digital signal generating path 136 is operable to process at least one of the in-phase and quadrature-phase parts of the mixing signal according to the central frequency and bandwidth of the third IF signal and a third sampling frequency, and thereby generate the third digital signal. In this case, the third sampling frequency is lower than the double of the maximum frequency of the third IF signal; in other words, the third sampling frequency is less than two times the maximum frequency of the three IF signals, so as to reduce the requirement of circuit capability and power consumption. Besides, the present embodiment may further comprise a frequency shifting circuit 140 operable to carry out frequency shift if any of the frequencies of said digital signals is a negative image frequency or an overly high image frequency, which means that the frequency shifting circuit 140 is operable to generate at least a frequency-shifted signal in accordance with at least a digital signal to be shifted. Of course, if there is no need to do frequency shift, this frequency shifting circuit 140 will not be necessary. In addition, the present embodiment may further comprise a baseband circuit (not shown) or cooperate with an independent baseband circuit; this baseband circuit should be able to process the said digital signals and/or frequency-shifted signals according to the frequency of the first digital signal or its frequency-shifted signal, the frequency of the second digital signal or its frequency-shifted signal, and the frequency of the third digital signal or the frequency-shifted signal thereof.

On the basis of the above description, in this embodiment, the third sampling frequency is higher than or equal to the first and second sampling frequency; therefore the maximum sampling frequency (i.e. the third sampling frequency) of the digital signal generating circuit 130 will be restricted to a frequency lower than the double of the maximum frequency (i.e. the maximum frequency of the third IF signal) of the foresaid IF signals, so that the requirement of circuit capability and power could be reduced. Please note that the sampling frequencies could be the same or different, and could be dependent on the decision of a person who carry out the present invention. Besides, since the third sampling frequency is lower than two times the maximum frequency of the third IF signal, the sampled result (i.e. the third digital signal) of the third IF signal will suffer aliasing, which means that this sampled result will exist at an image frequency of the third IF signal (i.e. (±kfs±fa) in which k is an integer, fs is the third sampling frequency and fa is the central frequency of the third IF signal) instead of the actual frequency of the third IF signal. Although aliasing is deemed a problem in the prior art, the present invention makes use of aliasing phenomenon to carry out harmonic sampling and thereby achieves the purpose of circuitry simplification and reduction of sampling frequency. More discussion on aliasing could be found in published books or documents.

Figure 2:
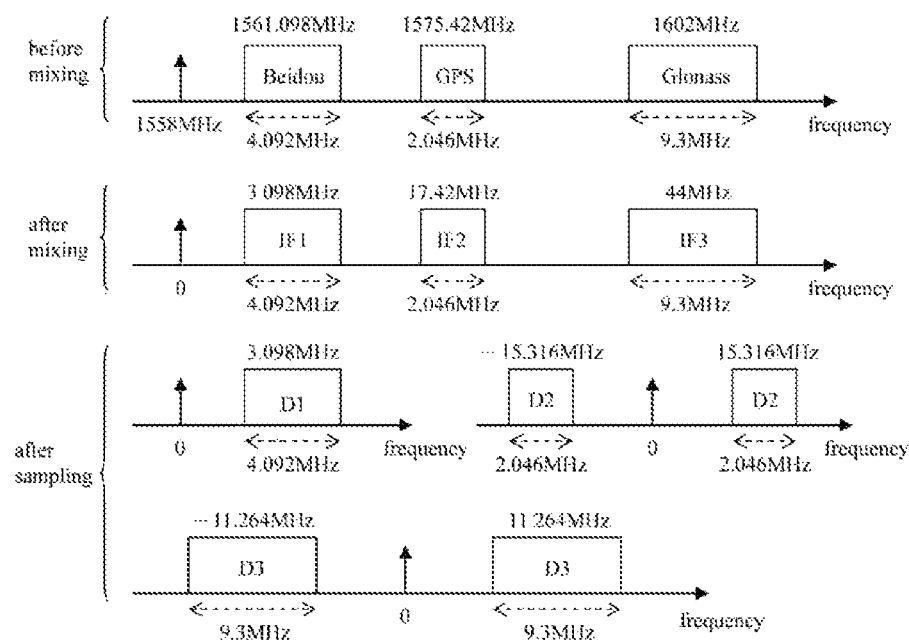
FIG. 2 illustrates the signal frequency distribution of an implementation example of the wireless signal receiving device of FIG. 1.

In accordance with the above description, here is an example as shown in FIG. 2. Provided that the first, second and third wireless signals are Beidou, GPS and Glonass signals in turn and the frequency of the local oscillation clock is 1558 MHz, through using an appropriate known mixing technique, the mixer 120 of FIG. 1 will be able to generate the first IF signal (IF1) of central frequency (1561.098−1558)=3.098 MHz, the second IF signal (IF2) of central frequency (1575.42−1558)=17.42 MHz, and the third IF signal (IF3) of central frequency (1602−1558) 44 MHz; in this case the first, second and third IF signals are associated with the first, second and third wireless signals respectively. Besides, if all the first, second and third sampling frequencies are 32.736 MHz, since this sampling frequency is higher than the double of the maximum frequency (i.e. (3.098+4.092/2)=5.144 MHz) of the first IF signal but lower than the double of the maximum frequency (i.e. (17.42+2.046/2)=18.443 MHz) of the second IF signal and the double of the maximum frequency (i.e. (44+9.3/2)=48.65 MHz) of the third IF signal, the better sampled results of the first, second and third IF signals (i.e. the first, second and third digital signals D1, D2, D3) will exist at the original frequency 3.098 MHz of the first IF signal, the image frequency ±(32.736−17.42)=±15.316 MHz of the second IF signal and the image frequency ±(32.736−44)=±11.264 MHz of the third IF signal in sequence. In consideration of that the second and/or third digital signals (i.e. the sampled results of the second and third IF signals) would be located at a negative frequency or a high positive frequency, the frequency shifting circuit 140 of FIG. 1 could do frequency shift to the second and/or third digital signals to generate the frequency-shifted signal(s) thereof at a proper positive frequency, and the central frequency of the frequency-shifted signal(s) could be determined according to a known or self-designed frequency-shift configuration chosen by those carrying out the present invention. Please note that in this example, since the types of wireless signals, the frequency of the local oscillation clock, the sampling frequency and the frequency of the better sampled results could be known, determined and derived in advance, if the second and/or third digital signals at the negative frequency domain are(is) adopted, in order to allow the frequency shifting circuit 140 to do frequency shift to the signal(s) at the negative frequency domain, the second digital signal generating path 134 and/or the third digital signal generating path 136 need(s) to be configured to deal with the in-phase and quadrature-phase parts of the mixing signal and generate the second and/or third digital accordingly; meanwhile, since the first digital signal has no need to be frequency-shifted, the first digital signal generating path 132 could be configured to deal with only one of the in-phase and quadrature-phase parts of the mixing signal.

Figure 3:
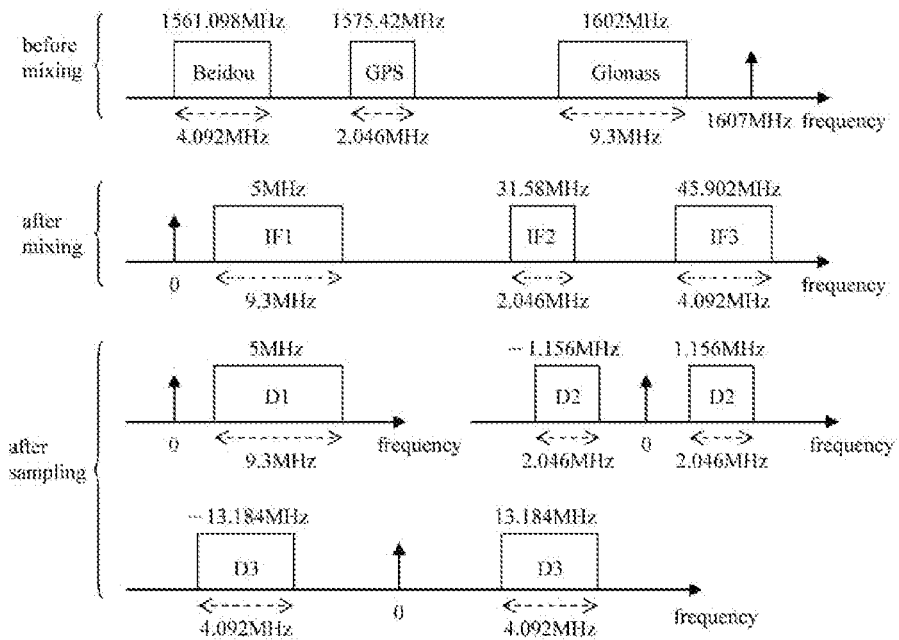
FIG. 3 illustrates the signal frequency distribution of another implementation example of the wireless signal receiving device of FIG. 1.

For another instance as shown in FIG. 3, provided that the first, second and third wireless signals are still Beidou, GPS and Glonass signals in sequence but the frequency of the local oscillation clock is 1607 MHz now, through using an appropriate known mixing technique, the mixer 120 of FIG. 1 will be able to generate the first IF signal (IF1) of central frequency (1607−1602)=5 MHz, the second IF signal (IF2) of central frequency (1607−1575.42)=31.58 MHz, and the third IF signal (IF3) of central frequency (1607−1561.098)=45.902 MHz; in this case the first, second and third IF signals are associated with the third, second and first wireless signals respectively. If the first, second and third sampling frequencies remain at 32.736 MHz, since the sampling frequency is higher than the double of the maximum frequency (i.e. (5+9.3/2)=9.65 MHz) of the first IF signal but lower than the double of the maximum frequency (i.e. (31.58+2.046/2)=32.603 MHz) of the second IF signal and the double of the maximum frequency (i.e. (44+4.092/2)=47.948 MHz) of the third IF signal, the better sampled results of the first, second and third IF signals (i.e. the first, second and third digital signals D1, D2, D3) will exist at the original frequency 5 MHz of the first IF signal, the image frequency ±(32.736−31.58)=±1.156 MHz of the second IF signal and the image frequency ±(32.736−45.902)=±13.184 MHz of the third IF signal in turn under a reasonable sampling bandwidth. Similarly, if any of the digital signals is at a negative frequency or an over high positive frequency, the frequency shifting circuit 140 of FIG. 1 will execute frequency shift to the digital signal and thereby generate the frequency-shifted signal thereof at a proper positive frequency while the central frequency of the frequency-shifted signal could be determined in accordance with a known or self-designed frequency-shift configuration chosen by those carrying out the present invention. Please note that in this example, if the digital signal at the negative frequency domain is adopted, in order to make the frequency shifting circuit 140 capable of doing frequency shift to the signal of negative frequency, the second digital signal generating path 134 and/or the third digital signal generating path 136 need(s) to be configured to deal with the in-phase and quadrature-phase parts of the mixing signal; in the meantime, the first digital signal generating path 132 could be configured to deal with only one of the in-phase and quadrature-phase parts of the mixing signal.

In light of the above, the grounds for the sampled result to be treated with a frequency shift process can be concluded as follows. If the double of the maximum frequency of the first IF signal is higher than the first sampling frequency while the frequency of the first digital signal is negative or higher than a predetermined value, the frequency shifting circuit 140 will generate a first frequency-shifted signal according to the first digital signal; if the double of the maximum frequency of the second IF signal is higher than the second sampling frequency while the frequency of the second digital signal is negative or higher than the predetermined value, the frequency shifting circuit 140 will generate a second frequency-shifted signal according to the second digital signal; and if the double of the maximum frequency of the third IF signal is higher than the third sampling frequency while the frequency of the third digital signal is negative or higher than the predetermined value, the frequency shifting circuit 140 will generate a third frequency-shifted signal according to the third digital signal. Said predetermined value could be determined by people of ordinary skill in the art in view of the implementation requirement (e.g. the capability of a concerned baseband circuit).

Please note that the frequency of the aforementioned local oscillation clock and the value(s) of the first, second and third sampling frequencies are just examples for people skilled in this filed to understand the present invention, not a restriction on the present invention. In consideration of different requirements of performance, cost and design requests, those of ordinary skill in the art may choose a local oscillation clock (which could be determined by the frequencies of the wireless signals, and thereby could be lower than the minimum frequency of the wireless signals, higher than the maximum frequency of the wireless signals or between any adjacent two of the frequencies of the wireless signals) other than the alleged one, and may choose other values of sampling frequencies. Besides, in order to generate the aforementioned in-phase and quadrature-phase parts of the mixing signal, the mixer 120 of FIG. 1 may include a first mixing unit and a second mixing unit (not shown) operable to generate the in-phase and quadrature-phase parts according to the local oscillation clock with 0 degree phase and the local oscillation clock with 90 degree phase respectively; however, if only the in-phase or quadrature-phase part is required, the mixer 120 could simply generate the required one. Since the mixing technique is well known in this field, unnecessary explanation is therefore omitted. Furthermore, the receiving circuit 110 of FIG. 1 may include an antenna or cooperate with an independent antenna to receive the wireless signal, and may include an amplifying circuit to amplify the wireless signal and generate the reception signal; since this part is also well known to those skilled in the art, further explanation is omitted as well.

Figure 4:
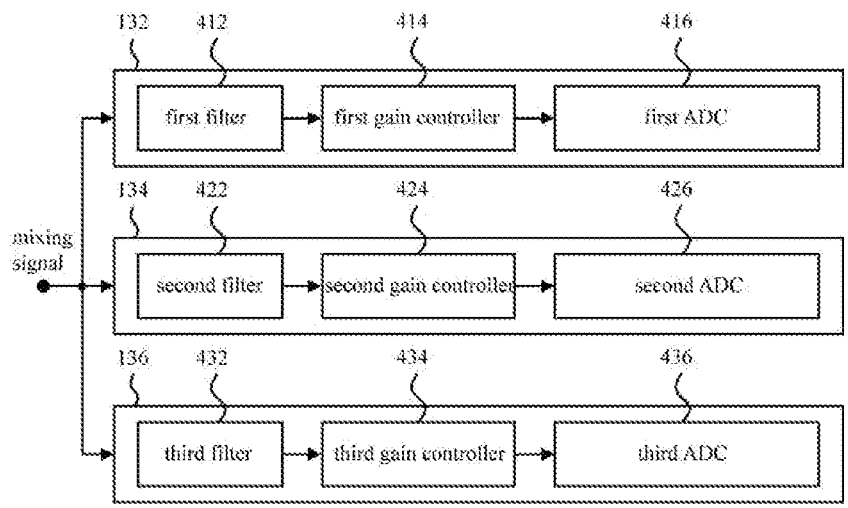
FIG. 4 illustrates an embodiment of the digital signal generating circuit of FIG. 1.

Please refer to FIG. 4 which illustrates an embodiment of the digital signal generating circuit 130. As it is shown in FIG. 4, the first digital signal generating path 132 includes: a first filter 412 operable to process at least one of the in-phase and quadrature-phase parts of the mixing signal according to the central frequency and bandwidth of the first IF signal, and thereby generate a first filtered signal, which means that the first IF signal could be obtained by the first filter 412; a first gain controller 414 operable to generate a first gain-processed signal according to the first filtered signal; and a first analog-to-digital converter (first ADC) 416 operable to convert the first gain-processed signal into the first digital signal according to the first sampling frequency. The second digital signal generating path 134 includes: a second filter 422 operable to process at least one of the in-phase and quadrature-phase parts of the mixing signal according to the central frequency and bandwidth of the second IF signal, and thereby generate a second filtered signal, which means that the second IF signal could be extracted by the second filter 422; a second gain controller 424 operable to generate a second gain-processed signal according to the second filtered signal; and a second analog-to-digital converter (second ADC) 426 operable to convert the second gain-processed signal into the second digital signal according to the second sampling frequency. The third digital signal generating path 136 includes: a third filter 432 operable to process at least one of the in-phase and quadrature-phase parts of the mixing signal according to the central frequency and bandwidth of the third IF signal, and thereby generate a third filtered signal, which means that the third IF signal could be derived by the third filter 432; a third gain controller 434 operable to generate a third gain-processed signal according to the third filtered signal; and a third analog-to-digital converter (third ADC) 436 operable to convert the third gain-processed signal into the third digital signal according to the third sampling frequency. In this embodiment, each of the above-mentioned first, second and third filters 412, 422, 432 could be an existing filter (e.g. a complex filter or a band-pass filter) appropriate for the implementation requirement, and each of the first, second and third gain controller 414, 424, 434 could be an existing gain controller (e.g. a programmable gain amplifier or an automatic gain controller) suitable for the need of implementation.

Additionally, the wireless signal receiving device 100 of FIG. 1 may further comprise: a control circuit (not shown) coupled with the digital signal generating circuit 130, operable to turn off some or all of at least one of the first, second and third digital signal generating paths 132, 134, 136 according to a prescribed condition, so as to make the receiving device 100 power conservative. Of course, this control circuit may also be coupled with the foresaid frequency shifting circuit 140 to turn off some or all of the frequency shifting circuit 140 in accordance with the prescribed condition, so that the power consumption could be further improved. For instance, provided that the first, second and third digital signal generating paths 132, 134, 136 are used to generate the first, second and third digital signals in connection with Beidou, GPS and Glonass signals respectively, if a user is going to locate his position with Beidou signal, the control circuit could turn off some circuits (e.g. the second and third analog-to-digital converter 426, 436) or all circuits of the second and third digital signal generating paths 134, 136 according to the above-mentioned prescribed condition (e.g. a condition based on the consideration of circuit capability and power consumption); meanwhile, if there is no need to do frequency shift to the first digital signal from the first digital signal generating path 132, the control circuit will be allowed to turn off some or all of the frequency shifting circuit 140 according to the prescribed condition, so as to prevent the waste of power. Since people of ordinary skill in the art can appreciate how to realize the control circuit (e.g. a switching circuit) in the way of firmware and/or hardware according to the teaching of this specification, redundant description is thus omitted provided the remaining disclosure is enough for understanding and enablement.

Figure 5:
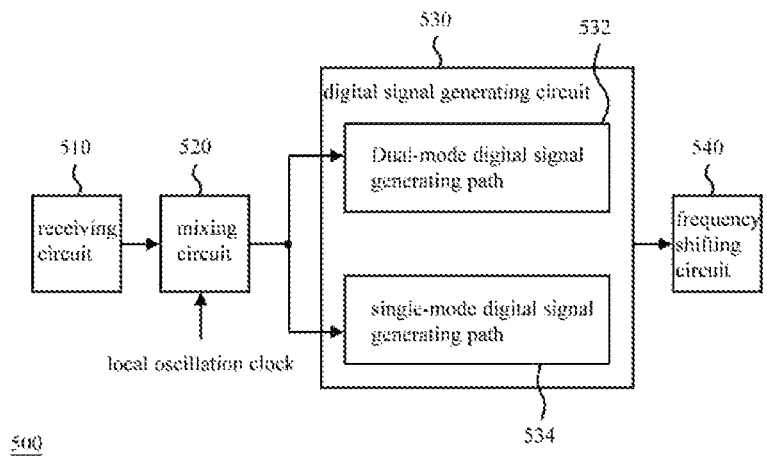
FIG. 5 illustrates another embodiment of the wireless signal receiving device of the present invention.

Please refer to FIG. 5 which illustrates another embodiment of the wireless signal receiving device of the present invention. The major difference between this embodiment and the embodiment of FIG. 1 is the configuration of the digital signal generating circuit; therefore, the following description will focus on the unmentioned matter of the embodiment of FIG. 1, and the repeated or similar explanation will be omitted. As it is shown in FIG. 5, the wireless signal generating device 500 comprises: a receiving circuit 510; a mixer 520; and a digital signal generating circuit 530. Said receiving circuit 510 is operable to generate a reception signal according to a wireless signal which includes a first wireless signal (e.g. Beidou or Glonass signal), a second wireless signal (GPS or Gaileo signal) and a third wireless signal (e.g. Glonass or Beidou signal) of different central frequencies. Said mixer 520 is operable to process the reception signal according to at least a local oscillation clock and thus generate a mixing signal which includes a first IF signal, a second IF signal and a third IF signal while the central frequency of the third IF signal is the maximum or minimum one among the central frequencies of the first, second and third IF signals. Said digital signal generating circuit 530 includes a dual-mode digital signal generating path 532 and a single-mode digital signal generating path 534; the dual-mode digital signal generating path 532 is operable to process at least one of the in-phase and quadrature-phase parts of the mixing signal according to a first sampling frequency and the central frequencies and bandwidths of the first and second IF signals, so as to generate a first digital signal related to both of the first and second IF signals; on the other hand, the single-mode digital signal generating path 534 is operable to process at least one of the in-phase and quadrature-phase parts of the mixing signal according to a second sampling frequency and the central frequency and bandwidth of the third IF signal, so as to generate a second digital signal related to the third IF signal. In this case, if the central frequency of the third IF signal is the maximum one among the central frequencies of the first, second and third IF signals, the second sampling frequency will be restricted to a frequency lower than the double of the maximum frequency of the third IF signal; and if the central frequency of the third IF signal is the minimum one among the central frequencies of the first, second and third IF signals, the first sampling frequency will be restricted to a frequency lower than the double of the maximum frequency of the first and second IF signals. In brief, the maximum sampling frequency of the digital signal generating circuit 530 will be confined to a frequency lower than the maximum frequency of the three IF signals, so as to lessen the requirement of circuit capability and power. In addition, the present embodiment, similar to the embodiment of FIG. 1, may comprise a frequency shifting circuit 540 operable to carry out frequency shift if any of the frequencies of said digital signals is at a negative image frequency or an overly high image frequency, so as to generate at least a frequency-shifted signal in accordance with at least a digital signal to be shifted. Of course, if none of the frequency shift process is necessary, this frequency shifting circuit 540 could be eliminated. Moreover, the present embodiment may further comprise a baseband circuit (not shown) or cooperate with an independent baseband circuit; this baseband circuit should be able to process the first digital signal or the frequency-shifted signal thereof and the second digital signal or the frequency-shifted signal thereof in accordance with the frequency of the first digital signal or its frequency-shifted signal and the frequency of the second digital signal or its frequency-shifted signal.

Figure 6:
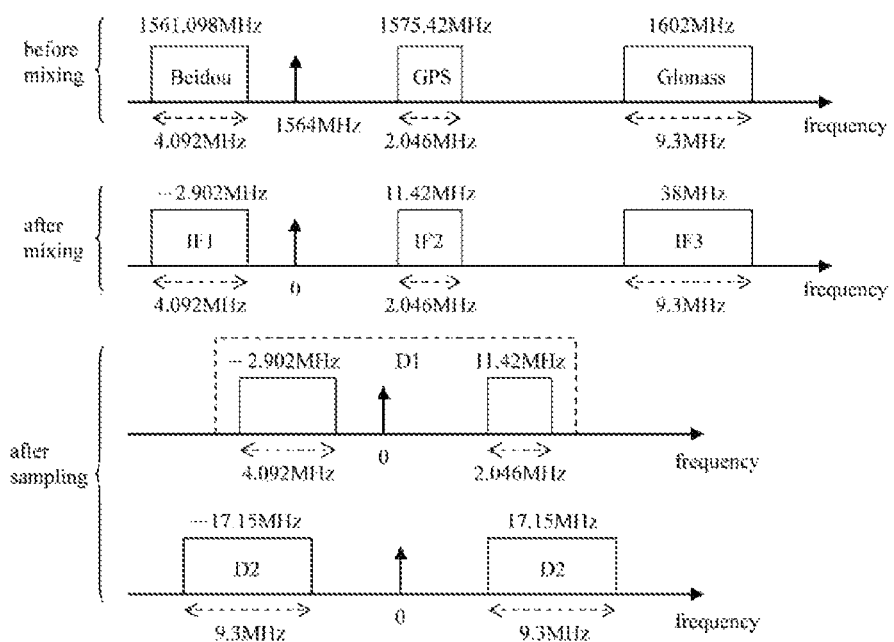
FIG. 6 illustrates the signal frequency distribution of an implementation example of the wireless signal receiving device of FIG. 5.

On the basis of the above description, here is an instance as shown in FIG. 6. Provided that the first, second and third wireless signals are Beidou, GPS and Glonass signals in turn and the frequency of the local oscillation clock is 1564 MHz between the frequencies of the first and second wireless signals, through using an appropriate known mixing technique, the mixer 520 of FIG. 5 will be able to generate the first IF signal (IF1) of central frequency (1561.098−1564)=−2.902 MHz, the second IF signal (IF2) of central frequency (1575.42−1564)=11.42 MHz, and the third IF signal (IF3) of central frequency (1602−1564)=38 MHz. If both the first and second sampling frequencies are 26 MHz, since the sampling frequency is higher than the absolute value of the double of the maximum frequency (i.e. the maximum one among 1-2.902−4.092/21=4.948 MHz and (11.42+2.046/2)=12.443 MHz) of the first and second IF signals but lower than the double of the maximum frequency (i.e. (38+9.3/2)=42.65 MHz) of the third IF signal, the better sampled results of the first, second and third IF signals (i.e. the first and second digital signals D1, D2) will exist at the original frequency −2.902 MHz (with bandwidth 4.092 MHz) of the first IF signal, the original frequency 11.42 MHz (with bandwidth 2.046 MHz) of the second IF signal, and one of the image frequencies ±(26−43.15)=±17.15 MHz (with bandwidth 9.3 MHz) of the third IF signal in sequence. In view of that a part of the first digital signal is located at the negative frequency domain and the frequency of the second digital signal could be negative or higher than a predetermined value, the frequency shifting circuit 540 of FIG. 5 may execute frequency shift to the first and second digital signals to generate the frequency-shifted signals thereof at a proper positive frequency in which the predetermined value and the central frequency of the frequency-shifted signals could be determined by those of ordinary skill in the art in light of their demand. Please note that in this example, in order to process the signals at the negative frequency domain, the dual-mode and single-mode digital signal generating path 532, 534 are designed to be able to generate the first and second digital signals by processing the in-phase and quadrature-phase parts of the mixing signal; but if the second digital signal will be merely derived from the signal at the positive frequency domain, the single-mode digital signal generating path 534 could be configured to deal with only one of the in-phase and quadrature-phase parts of the mixing signal.

Figure 7:
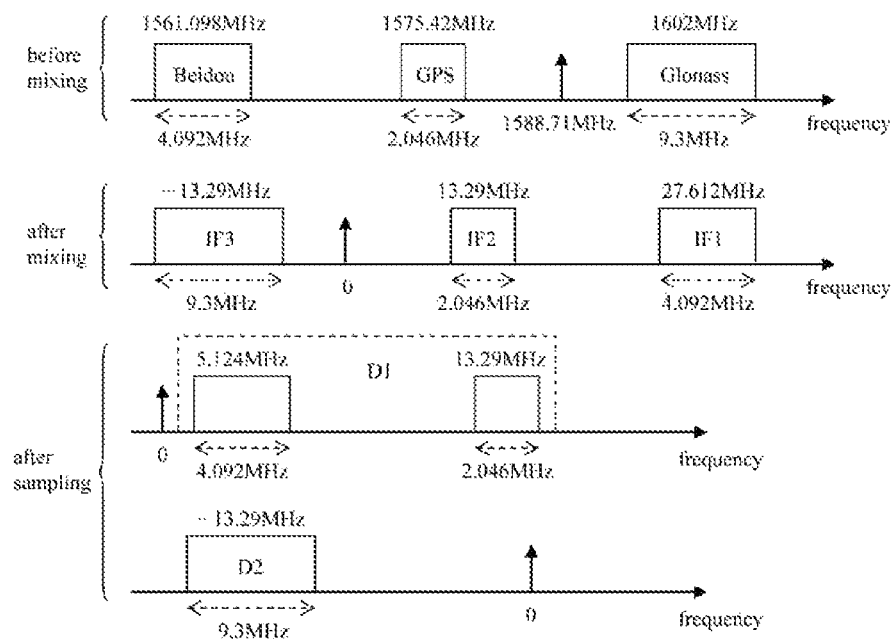
FIG. 7 illustrates the signal frequency distribution of another implementation example of the wireless signal receiving device of FIG. 5.

The following description is another instance as shown in FIG. 7. Provided that the first, second and third wireless signals are still Beidou, GPS and Glonass signals in turn but the frequency of the local oscillation clock is 1588.71 MHz between the frequencies of the second and third wireless signals, through using a fitting known mixing technique, the mixer 520 of FIG. 5 will be able to generate the first IF signal (IF1) of central frequency (1588.71−1561.098)=27.612 MHz, the second IF signal (IF2) of central frequency (1588.71−1575.42)=13.29 MHz, and the third IF signal (IF3) of central frequency (1588.71−1602)=−13.29 MHz. Besides, if the first and second sampling frequencies are 32.736 MHz, the better sampled results of the first, second and third IF signals (i.e. the first and second digital signals D1, D2) will exist at the image frequency ±(32.736−27.612)=±5.124 MHz (with bandwidth 4.092 MHz) of the first IF signal, the original frequency 13.29 MHz (with bandwidth 2.046 MHz) of the second IF signal and the original frequency −13.29 MHz (with bandwidth 9.3 MHz) of the third IF signal in sequence. In consideration of a reasonable sampling bandwidth, the better sampled result of the first IF signal should be the signal at the frequency 5.124 MHz; therefore, only the second digital signal is at the negative frequency domain and thus needs to be frequency-shifted through the frequency shifting circuit 540 of FIG. 5. As it is described in the preceding paragraph, the central frequency of the frequency-shifted signal could be determined in accordance with a known or self-designed frequency-shift configuration chosen by those carrying out the present invention. Please note that in this example, the dual-mode digital signal generating path 532 is simply required to process one of the in-phase and quadrature-phase part of the mixing signal, but the single-mode digital signal generating path 534 which has to take care of the signal of negative frequency is required to process the in-phase and quadrature-phase parts of the mixing signal.

In light of the above, the reasons of a sampled result to go through a frequency shift process can be concluded as follows. If the double of the maximum frequency of the first and second IF signals is higher than the first sampling frequency while the frequency of the first digital signal is negative or higher than a predetermined value, the frequency shifting circuit 540 will generate a first frequency-shifted signal according to the first digital signal; and if the double of the maximum frequency of the third IF signal is higher than the double of the second sampling frequency while the frequency of the second digital signal is negative or higher than the predetermined value, the frequency shifting circuit 540 will generate a second frequency-shifted signal according to the second digital signal. Said predetermined value could be determined by those of ordinary skill in the art according to the implementation requirement.

Figure 8:
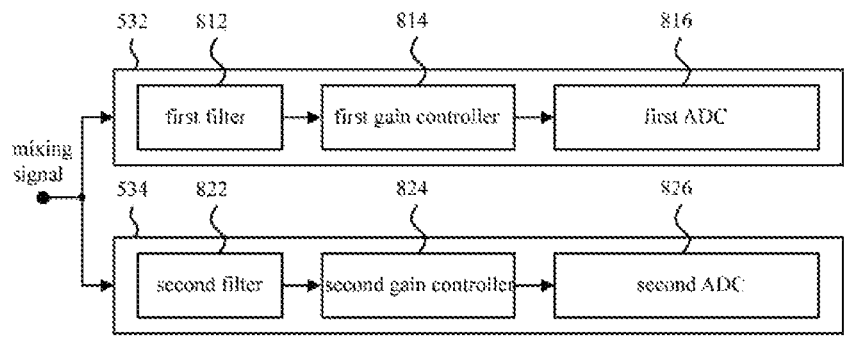
FIG. 8 illustrates an embodiment of the digital signal generating circuit of FIG. 5.

Please refer to FIG. 8 which illustrates an embodiment of the digital signal generating circuit 530 of FIG. 5. As it is shown the figure, the dual-mode digital signal generating path 532 includes: a first filter 812; a first gain controller 814; and a first analog-to-digital converter 816. Said first filter 812 (e.g. a low-pass filter) is operable to process at least one of the in-phase and quadrature-phase parts of the mixing signal according to the central frequencies and bandwidths of the first and second IF signals, and thereby generate a first filtered signal; more specifically, the first and second IF signals could be extracted by the first filter 812. Said first gain controller 814 is operable to generate a first gain-processed signal according to the first filtered signal. Said first analog-to-digital converter (first ADC) 816 is operable to convert the first gain-processed signal into the first digital signal according to the first sampling frequency. On the other hand, the single-mode digital signal generating path 534 includes: a second filter 822; a second gain controller 824; and a second analog-to-digital converter 826. Said second filter 822 (e.g. a complex filter) is operable to process at least one of the in-phase and quadrature-phase parts of the mixing signal according to the central frequency and bandwidth of the third IF signal, and thereby generate a second filtered signal; more specifically, the third IF signal could be obtained by the second filter 822. Said second gain controller 824 is operable to generate a second gain-processed signal according to the second filtered signal. Finally, said second analog-to-digital converter (second ADC) 826 is operable to convert the second gain-processed signal into the second digital signal according to the second sampling frequency.

Besides, as it is taught in the embodiment of FIG. 1, the embodiment of FIG. 5 may also include: a control circuit (not shown) coupled with the digital signal generating circuit 530, operable to turn off some or all of at least one of the first and second digital signal generating paths in accordance with a prescribed condition. This control circuit may be further connected with the frequency shifting circuit 540 to thereby shut down some or all of the frequency shifting circuit 540.

Figure 9:
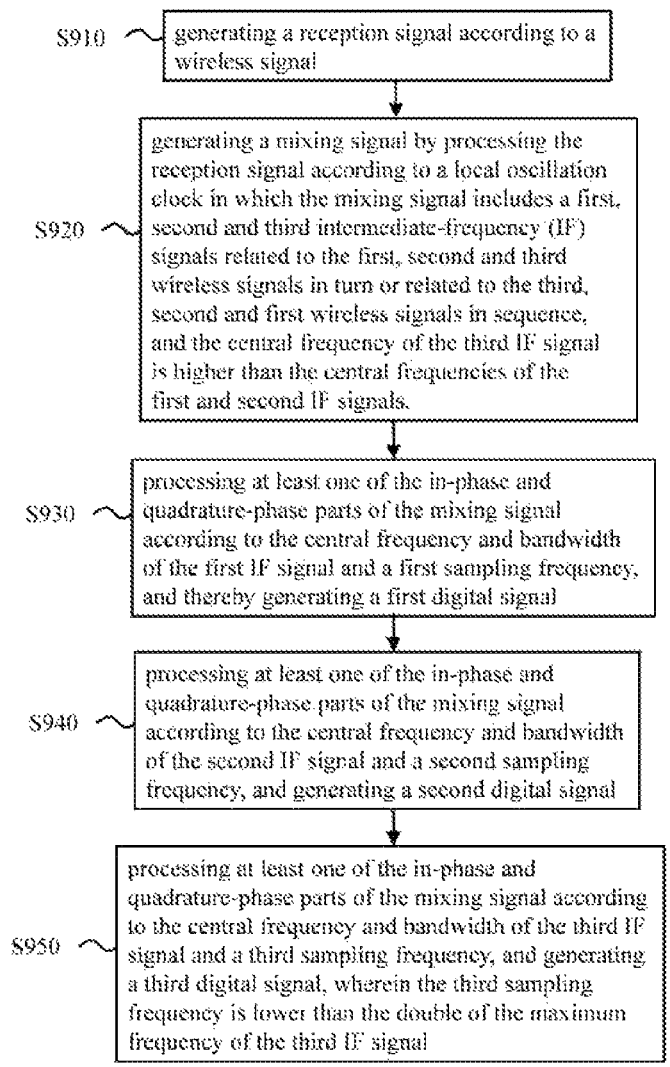
FIG. 9 illustrates an embodiment of the wireless signal receiving method of the present invention.

In addition to the fore-disclosed device invention, the present invention also discloses a wireless signal receiving method capable of receiving at least three kinds of wireless signals of different central frequencies. As it is shown in FIG. 9, an embodiment of the method comprises the following steps:

Step S910: generating a reception signal according to a wireless signal including a first wireless signal (i.e. Beidou signal), a second wireless signal (e.g. GPS signal or Galileo signal) and a third wireless signal (e.g. Glonass signal) while the central frequencies of the three signals are all different. This step could be carried out by the receiving circuit 110 of FIG. 1 or its equivalent.

Step S920: generating a mixing signal by processing the reception signal according to a local oscillation clock in which the mixing signal includes a first, second and third intermediate-frequency (IF) signals related to the first, second and third wireless signals in turn or related to the third, second and first wireless signals in sequence, and the central frequency of the third IF signal is higher than the central frequencies of the first and second IF signals. This step could be executed by the mixer 120 of FIG. 1 or its equivalent.

Step S930: processing at least one of the in-phase and quadrature-phase parts of the mixing signal according to the central frequency and bandwidth of the first IF signal and a first sampling frequency, and thereby generating a first digital signal. This step could be done by the first digital signal generating path 132 of FIG. 1 or the equivalent thereof.

Step S940: processing at least one of the in-phase and quadrature-phase parts of the mixing signal according to the central frequency and bandwidth of the second IF signal and a second sampling frequency, and thereby generating a second digital signal. This step could be carried out by the second digital signal generating path 134 of FIG. 1 or its equivalent.

Step S950: processing at least one of the in-phase and quadrature-phase parts of the mixing signal according to the central frequency and bandwidth of the third IF signal and a third sampling frequency, and thereby generating a third digital signal, wherein the third sampling frequency is lower than the double of the maximum frequency of the third IF signal for relieving the requirement of circuit capability and power consumption. This step could be executed by the third digital signal generating path 136 of FIG. 1 or its equivalent.

Since those of ordinary skill in the art can appreciate the implementation detail and the modification thereto of this method invention such as the frequency shift process of signal, the frequency of local oscillation clock, the relationship between the sampling frequency and sampled result and etc. by referring to the fore-illustrated embodiment of FIG. 1, repeated and redundant description is therefore omitted provided that the remaining disclosure is still enough for understanding and enablement.

Figure 10:
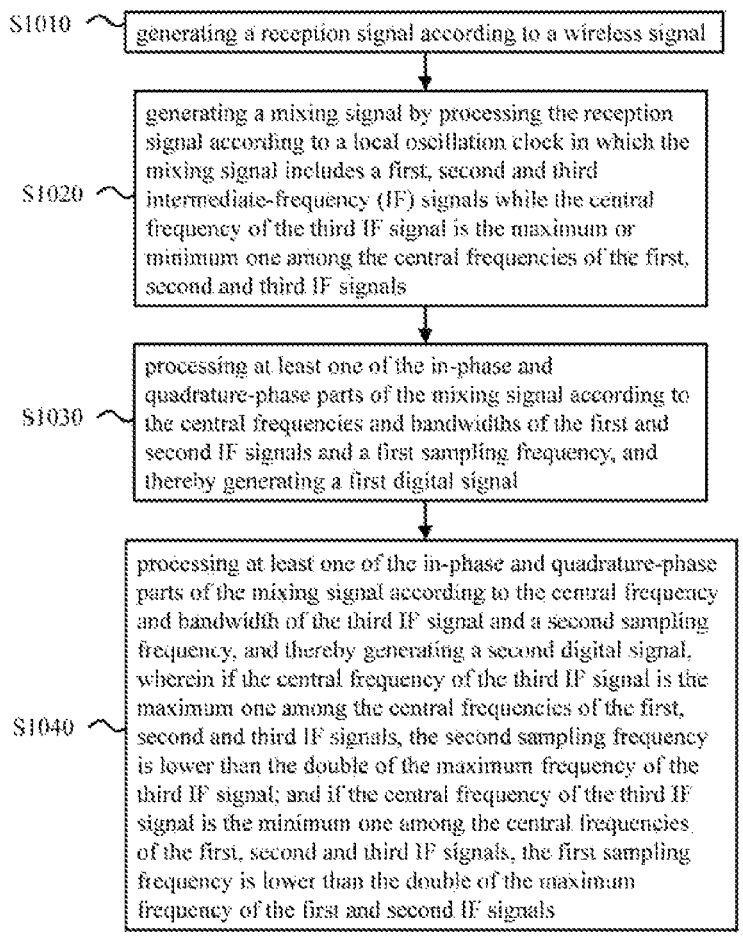
FIG. 10 illustrates another embodiment of the wireless signal receiving method of the present invention.

Moreover, another embodiment of the wireless signal receiving method of the present invention as shown in FIG. 10 comprises the following steps:

Step S1010: generating a reception signal according to a wireless signal including a first wireless signal (e.g. Beidou signal), a second wireless signal (e.g. GPS signal or Galileo signal) and a third wireless signal (e.g. Glonass signal) while the central frequencies of these three signals are all different. This step could be executed by the receiving circuit 510 of FIG. 5 or its equivalent.

Step S1020: generating a mixing signal by processing the reception signal according to a local oscillation clock in which the mixing signal includes a first, second and third intermediate-frequency (IF) signals while the central frequency of the third IF signal is the maximum or minimum one among the central frequencies of the first, second and third IF signals. This step could be done by the mixer 520 of FIG. 5 or the equivalent thereof.

Step S1030: processing at least one of the in-phase and quadrature-phase parts of the mixing signal according to the central frequencies and bandwidths of the first and second IF signals and a first sampling frequency, and thereby generating a first digital signal. This step could be carried out by the dual-mode digital signal generating path 532 or its equivalent.

Step S1040: processing at least one of the in-phase and quadrature-phase parts of the mixing signal according to the central frequency and bandwidth of the third IF signal and a second sampling frequency, and thereby generating a second digital signal. This step could be done by the single-mode digital signal generating path 534 or its equivalent. Furthermore, if the central frequency of the third IF signal is the maximum one among the central frequencies of the first, second and third IF signals, the second sampling frequency is lower than the double of the maximum frequency of the third IF signal; and if the central frequency of the third IF signal is the minimum one among the central frequencies of the first, second and third IF signals, the first sampling frequency is lower than the double of the maximum frequency of the first and second IF signals; therefore, the waste of circuit performance and power could be avoided.

Similarly, since those of ordinary skill in the art can appreciate the implementation detail and the modification thereto of this method invention like the frequency shift process of signal, the frequency of local oscillation clock, the relationship between the sampling frequency and sampled result and etc. by referring to the fore-illustrated embodiment of FIG. 5, repeated and redundant description is therefore omitted provided that the remaining disclosure is still enough for understanding and enablement.

Please note that the shape, size, and ratio of any element and the step sequence of any flow chart in the figures are just exemplary for understanding, not for limiting the scope of this invention. Besides, each embodiment in the foregoing description includes one or more features; however, this doesn't mean that one carrying out the present invention should make use of all the features of one embodiment at the same time, or should only carry out different embodiments separately. In other words, if an implementation derived from one or more of the embodiments is practicable, a person of ordinary skill in the art can selectively make use of some or all of the features in one embodiment or selectively make use of the combination of some or all features in several embodiments to have the implementation come true, so as to increase the flexibility of carrying out the present invention.

In summary, the wireless signal receiving device and method of the present invention include at least the following advantages. First, one single local oscillation clock will be enough for this invention to down-convert at least three wireless signals of different central frequencies, so that the cost could be reduced. Second, a low sampling frequency is sufficient to carry out analog-to-digital conversion, so that the requirement of circuit capability and power could be relieved; in other words, this invention makes use of an aliasing signal, which should be filtered out in the prior art, to do harmonic sampling, so as to balance the performance requirement and cost. Third, a control circuit of this invention could turn off idle circuits to make the device and method more power conservative.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless signal receiving device capable of receiving three or more signals of different central frequencies, comprising:
   a receiving circuit operable to generate a reception signal according to a wireless signal including a first, second and third wireless signals of different central frequencies;
   a mixer operable to generate a mixing signal by processing the reception signal according to a local oscillation clock in which the mixing signal includes a first, second and third intermediate-frequency (IF) signals related to the first, second and third wireless signals in turn while the maximum frequency of the third IF signal is higher than the maximum frequency of the first and second IF signals;
   a digital signal generating circuit including:
      a first digital signal generating path operable to process at least one of the in-phase and quadrature-phase parts of the mixing signal according to the central frequency and bandwidth of the first IF signal and a first sampling frequency, and thereby generate a first digital signal;
      a second digital signal generating path operable to process at least one of the in-phase and quadrature-phase parts of the mixing signal according to the central frequency and bandwidth of the second IF signal and a second sampling frequency, and thereby generate a second digital signal; and
      a third digital signal generating path operable to process at least one of the in-phase and quadrature-phase parts of the mixing signal according to the central frequency and bandwidth of the third IF signal and a third sampling frequency, and thereby generate a third digital signal, wherein the third sampling frequency is lower than the double of the maximum frequency of the third IF signal; and a control circuit coupled with the digital signal generating circuit, operable to turn off some or all of at least one of the first, second and third digital signal generating paths according to a prescribed condition.

2. The wireless signal receiving device of claim 1, further comprising:

a frequency shifting circuit operable to generate at least one frequency-shifted signal according to at least one of the first, second and third digital signals.

3. The wireless signal receiving device of claim 2, wherein:

if the double of the maximum frequency of the first IF signal is higher than the first sampling frequency while the frequency of the first digital signal is negative or higher than a predetermined value, the frequency shifting circuit is operable to generate a first frequency-shifted signal according to the first digital signal;

if the double of the maximum frequency of the second IF signal is higher than the second sampling frequency while the frequency of the second digital signal is negative or higher than the predetermined value, the frequency shifting circuit is operable to generate a second frequency-shifted signal according to the second digital signal; and if the double of the maximum frequency of the third IF signal is higher than the third sampling frequency while the frequency of the third digital signal is negative or higher than the predetermined value, the frequency shifting circuit is operable to generate a third frequency-shifted signal according to the third digital signal.

4. The wireless signal receiving device of claim 1, wherein the first, second and third sampling frequencies are equivalent.

5. The wireless signal receiving device of claim 1, wherein the intervals between any adjacent two of the central frequencies of the first, second and third wireless signals are all different.

6. The wireless signal receiving device of claim 1, wherein the bandwidths of the first, second and third wireless signals are all different.

7. The wireless signal receiving device of claim 1, wherein the first, second and third wireless signals are satellite positioning signals.

8. The wireless signal receiving device of claim 1, wherein:

the first digital signal generating path includes:
a first filter operable to process at least one of the in-phase and quadrature-phase parts of the mixing signal according to the central frequency and bandwidth of the first IF signal, and thereby generate a first filtered signal;
a first gain controller operable to generate a first gain-processed signal according to the first filtered signal; and
a first analog-to-digital converter operable to convert the first gain-processed signal into the first digital signal according to the first sampling frequency;

the second digital signal generating path includes:
a second filter operable to process at least one of the in-phase and quadrature-phase parts of the mixing signal according to the central frequency and bandwidth of the second IF signal, and thereby generate a second filtered signal;
a second gain controller operable to generate a second gain-processed signal according to the second filtered signal; and
a second analog-to-digital converter operable to convert the second gain-processed signal into the second digital signal according to the second sampling frequency; and the third digital signal generating path includes:
a third filter operable to process at least one of the in-phase and quadrature-phase parts of the mixing signal according to the central frequency and bandwidth of the third IF signal, and thereby generate a third filtered signal;
a third gain controller operable to generate a third gain-processed signal according to the third filtered signal; and
a third analog-to-digital converter operable to convert the third gain-processed signal into the third digital signal according to the third sampling frequency.

9. The wireless signal receiving device of claim 1, wherein the at least one local oscillation clock is a single clock and the frequency thereof is lower than the minimum frequency of the first, second and third wireless signals or higher than the maximum frequency of the first, second and third wireless signals.

10. The wireless signal receiving device of claim 1, further comprising:

a frequency shifting circuit operable to generate at least one frequency-shifted signal according to at least one of the first, second and third digital signals,
wherein the control circuit is coupled with the frequency shifting circuit and operable to turn off some or all of the frequency shifting circuit according to the prescribed condition.

11. A wireless signal receiving device capable of receiving three or more signals of different central frequencies, comprising:

a receiving circuit operable to generate a reception signal according to a wireless signal including a first, second and third wireless signals of different central frequencies;

a mixer operable to generate a mixing signal by processing the reception signal according to a local oscillation clock in which the mixing signal includes a first, second and third intermediate-frequency (IF) signals while the central frequency of the third IF signal is the maximum or minimum one among the central frequencies of the first, second and third IF signals; and a digital signal generating circuit including:

a dual-mode digital signal generating path operable to process at least one of the in-phase and quadrature-phase parts of the mixing signal according to the central frequencies and bandwidths of the first and second IF signals and a first sampling frequency, and thereby generate a first digital signal; and a single-mode digital signal generating path operable to process at least one of the in-phase and quadrature-phase parts of the mixing signal according to the central frequency and bandwidth of the third IF signal and a second sampling frequency, and thereby generate a second digital signal, wherein if the central frequency of the third IF signal is the maximum one among the central frequencies of the first, second and third IF signals, the second sampling frequency is lower than the double of the maximum frequency of the third IF signal; and if the central frequency of the third IF signal is the minimum one among the central frequencies of the first, second and third IF signals, the first sampling frequency is lower than the double of the maximum frequency of the first and second IF signals.

12. The wireless signal receiving device of claim 11, further comprising:
   a frequency shifting circuit operable to generate at least a frequency-shifted signal according to at least one of the first and second digital signals.

13. The wireless signal receiving device of claim 12, wherein:
   if the double of the maximum frequency of the first and second IF signals is higher than the first sampling frequency while the frequency of the first digital signal is negative or higher than a predetermined value, the frequency shifting circuit is operable to generate a first frequency-shifted signal according to the first digital signal; and
   if the double of the maximum frequency of the third IF signal is higher than the second sampling frequency while the frequency of the second digital signal is negative or higher than the predetermined value, the frequency shifting circuit is operable to generate a second frequency-shifted signal according to the second digital signal.

14. The wireless signal receiving device of claim 11, wherein the intervals between any adjacent two of the central frequencies of the first, second and third wireless signals are all different.

15. The wireless signal receiving device of claim 11, wherein the bandwidths of the first, second and third wireless signals are all different.

16. The wireless signal receiving device of claim 12, wherein:
   the dual-mode digital signal generating path includes:
      a first filter operable to process at least one of the in-phase and quadrature-phase parts of the mixing signal according to the central frequencies and bandwidths of the first and second IF signals, and thereby generate a first filtered signal;
      a first gain controller operable to generate a first gain-processed signal according to the first filtered signal; and
      a first analog-to-digital converter operable to convert the first gain-processed signal into the first digital signal according to the first sampling frequency, and
   the single-mode digital signal generating path includes:
      a second filter operable to process at least one of the in-phase and quadrature-phase parts of the mixing signal according to the central frequency and bandwidth of the third IF signal, and thereby generate a second filtered signal;
      a second gain controller operable to generate a second gain-processed signal according to the second filtered signal; and
      a second analog-to-digital converter operable to convert the second gain-processed signal into the second digital signal according to the second sampling frequency.

17. The wireless signal receiving device of claim 11, wherein the at least one local oscillation clock is a single clock and the frequency thereof stays between the frequencies of any adjacent two of the first, second and third wireless signals.

18. The wireless signal receiving device of claim 11, further comprising:
   a control circuit coupled with the digital signal generating circuit, operable to turn off some or all of at least one of the dual-mode and single-mode digital signal generating paths according to a prescribed condition.

19. The wireless signal receiving device of claim 18, further comprising:
   a frequency shifting circuit operable to generate at least a frequency-shifted signal according to at least one of the first and second digital signals,
   wherein the control circuit is coupled with the frequency shifting circuit and operable to turn off some or all of the frequency shifting circuit according to the prescribed condition.

* * * * *